A. A. STUTSMAN.
APPARATUS FOR PREVENTING SCALE DEPOSIT AND FOAMING IN BOILERS.
APPLICATION FILED MAR. 7, 1919.

1,419,701. Patented June 13, 1922.

WITNESSES

INVENTOR.
A. A. Stutsman,
BY
Victor J. Evans ATTORNEY.

UNITED STATES PATENT OFFICE.

ABRAHAM A. STUTSMAN, OF HAMMOND, INDIANA.

APPARATUS FOR PREVENTING SCALE DEPOSIT AND FOAMING IN BOILERS.

1,419,701. Specification of Letters Patent. Patented June 13, 1922.

Application filed March 7, 1919. Serial No. 281,133.

*To all whom it may concern:*

Be it known that I, ABRAHAM A. STUTSMAN, a citizen of the United States, residing at Hammond, in the county of Lake and State of Indiana, have invented new and useful Improvements in Apparatus for Preventing Scale Deposit and Foaming in Boilers, of which the following is a specification.

My invention is concerned with certain accessories combined with a boiler in a novel grouping and arrangement so that I obtain, without the employment of any positive pumping mechanism an adequate circulation which carries the surface water with the temporarily floating or suspended insoluble precipitates and possibly some adhering scum thereon down out of the boiler into a tank, where the insoluble precipitates and the possibly adhering scum settles on its bottom, whence it can be blown out as necessary, and the water minus the most of the precipitates and some of the scum flows back into the bottom of the boiler, so that so much of a continuous circulation as is necessary to prevent the deposit of most of the scale in the boiler can be secured.

It is further concerned with a novel sediment collecting pan which is adapted to form an especially efficient element of such a system.

Another object is to so relatively arrange and combine the settling pan that the same, in addition to the function stated, will contribute materially in preventing foaming of the boiler.

With the foregoing in mind the invention will be fully understood from the following description and claims when the same are read in connection with the accompanying drawings hereby made a part hereof, in which:

Similar numerals of reference designate corresponding parts in both views of the drawings.

Figure 1:
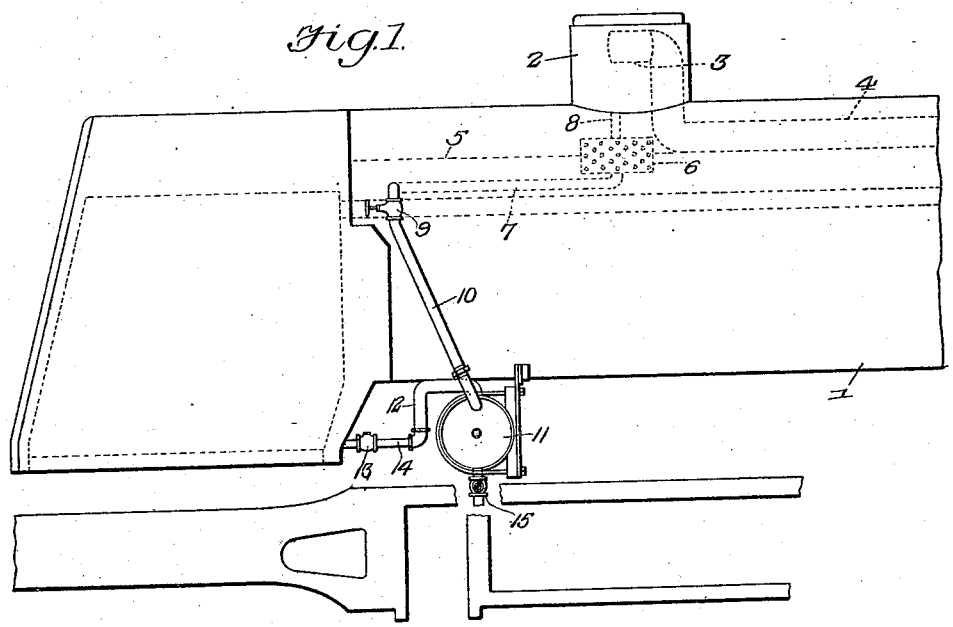
Figure 1 is a longitudinal view showing a boiler equipped with an apparatus constructed in accordance with my invention.

The boiler 1 illustrated is provided with the usual dome 2 in which is disposed the usual throttle 3, the latter being illustrated by dotted lines, as is also the dry pipe 4 leading thereto.

In furtherance of my invention I arrange below and in reasonably close proximity to the dome 2 and throttle 3, and in about the position illustrated relative to the water line indicated by 5, a settling pan 6. The said pan 6 is open at its top and imperforate at its bottom, and is provided with a foraminous side wall. From this it follows that the water will enter the pan through the apertures in the side wall thereof, and hence the water will be held in a zone of comparative quiet precedent to the passage of the water to the point of re-entry, which manifestly will contribute to the removal from the water of sediment. The prescribed arrangement of the settling pan 6 with respect to the throttle 3 is materially advantageous, inasmuch as the settling pan will in effect and by reason of its imperforate bottom serve as a baffle for the throttle, and thereby tend to prevent the objectionable foaming of the boiler.

Figure 2:
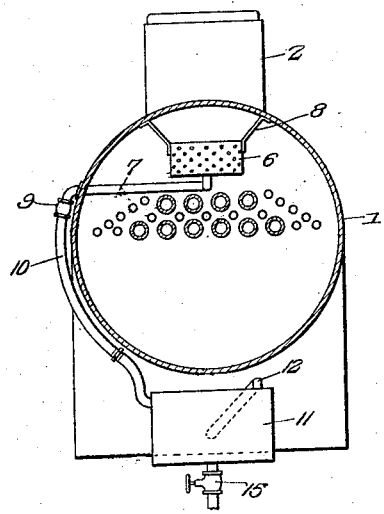
Figure 2 is a transverse sectional view of the same.

Communicating with the interior of the settling pan 6 and leading from the bottom thereof in a generally downward direction and never upward is one of the pipes 7 of the circulation system; the said pipe being preferably, though not necessarily, disposed transversely of the boiler, Figure 2. The pan 6 is preferably maintained in position through the medium of hangers 8, Figure 2. At its outer end the pipe 7, in the illustrated embodiment, merges into the casing of a gate or other suitable valve 9, and the said valve casing, in turn, merges into a downwardly extending pipe 10, disposed exteriorly of the boiler. In communication with the lower portion of the pipe 10 is a settling tank 11, which may be disposed in the manner shown or in any other approved manner without affecting my invention. Leading from the interior of the settling tank 11 to any suitable point of re-entry in the boiler, is a conduit 12 in which is a non-return valve 13, arranged to open toward the point of re-entry. In the preferred embodiment of my invention I have the conduit 12 comprise a short section 14 immediately adjacent the point of re-entry of considerably reduced size in cross-section; the said section 14 preferably carrying the non-return valve 13 and being materially advantageous for a reason hereinafter explicitly set forth.

The operation of my device I believe to be as follows, for the reason set forth: When the boiler is being fired up, the valve 9 is closed with the result that the water in the boiler becomes much hotter than that in the pipe 10, so that when the valve 9 is opened when the steaming is fairly started, there exists the installation for obtaining a circulation like that of a hot water heating system, and the cold water of the pipe 10 flows downwardly into the tank 11, thence through the pipe 12 to re-enter the boiler at the bottom where it is heated and rises to the surface. The ebullition of the water causes bubbles of steam to rise throughout the boiler, but inasmuch as the bottom of the pan 6 is imperforate (except for its discharge into the pipe 7) the water in the pan is quiet (as no bubbles rise through it), while the water around it is boiling up and stands at a slightly higher average level, so that the surface water carrying the temporarily suspended and floating insoluble precipitates and the scum flows through its foraminous sides into the pan, and the circulation thus established carries the entering surface water with its precipitates scum down into the tank 11, where the precipitates and some adhering scum settles, while the water goes on through the valve 13 back into the boiler. It will be noticed that the circulation is facilitated, and consequently increased, by providing that there is no rise in the pipes 7 and 10, so that the water flows freely by gravity, aided by the lower temperature of the pipe 10, which results from its being outside of the boiler. Furthermore, there are no pockets inside in these pipes where the insoluble precipitates and adhering scum can settle, as the water flows steadily through the pipe 7 washing the precipitates and scum along the bottom, even if it should tend to settle in it. With an upstanding portion of the pipe in which the water rises, a place would exist where the precipitates and adhering scum could settle and soon fill up the horizontal portion of the pipe to stop the circulation. The reduction in the size of the pipe 14 as compared with the pipe 12 produces a nozzle effect and gives under the steam pressure and with the check valve 13 the further action of an injector tending to force the water from the tank 11 into the bottom of the boiler, thus increasing the circulation, so that by the combined action of the elements entering into the novel combination I secure a rapid circulation of the surface water carrying the insoluble precipitates and scum downward through the pipes 7 and 10, while at the same time permitting the precipitates and adhering scum to settle in the tank 11, while the water flows on through the pipes 12 and 14 and past the check valve 13 back into the bottom of the boiler. At suitable intervals the insoluble precipitates and adhering scum which accumulates as a deposit in the bottom of the tank 11 is blown off by opening the cock 15 in the bottom thereof, in which case the pressure of the steam in the boiler forces its contents out through the cock 15, carrying with it the accumulated precipitates and adhering scum.

While I have shown and described my invention as embodied in the form which I at present consider best adapted to carry out its purposes, it will be understood it is capable of modification and that I do not desire to be limited in the interpretation of the following claims, except as may be necessitated by the state of the prior art.

Having described my invention, what I claim and desire to secure by Letters-Patent, is:

1. In combination with a boiler having a steam dome and a steam pipe therein, of a scale preventer comprising a collecting pan having a closed base and a perforated wall with an open top, said pan disposed at approximately the water level in the boiler and spaced substantially below the steam dome, a settling tank arranged beneath the boiler close to the fire box, a pipe communicating with the bottom of the collecting pan and extending down to and connected with the top portion of the settling tank, a second pipe leading from the upper portion of the settling tank to the portion of the boiler about the fire box, and blow-off means for the settling tank.

2. In combination with a boiler having a steam dome having a steam pipe therein, of a scale preventer comprising a collecting pan arranged substantially beneath the steam dome and spaced downwardly therefrom, said collecting pan having a closed bottom, a perforated side wall and an open top and being arranged at approximately the water level to collect sediment through all sides and top of the pan, a settling tank held beneath the boiler near the fire box, a relatively large pipe communicating with the bottom of the collecting pan and extending downwardly therefrom throughout its length and communicating with the top portion of the settling tank, means in the pipe to control the flow therethrough, and a second relatively short pipe communicating with the top portion of the settling tank and extending downwardly to the portion of the boiler about the fire box, a portion of said pipe being of reduced diameter and having a check valve therein, and a blow-off device in the base of the settling tank.

In testimony whereof I affix my signature.

ABRAHAM A. STUTSMAN.